(12) United States Patent
Oh et al.

(10) Patent No.: US 11,874,013 B1
(45) Date of Patent: Jan. 16, 2024

(54) AI-BASED TOTAL ENERGY MANAGEMENT SYSTEM FOR HIGH ENERGY EFFICIENCY OF LOGISTICS CENTER

(71) Applicant: Korea Conformity Laboratories, Seoul (KR)

(72) Inventors: Jaeyoung Oh, Gwangmyeong-si (KR); Sanguk Suh, Seoul (KR); Minjung Joo, Seoul (KR); Kyunghoon Jang, Gunpo-si (KR)

(73) Assignee: KOREA CONFORMITY LABORATORIES, Seoul (KR)

( * ) Notice: Subject to any disclaimer, the term of this patent is extended or adjusted under 35 U.S.C. 154(b) by 0 days.

(21) Appl. No.: 18/107,419

(22) Filed: Feb. 8, 2023

(30) Foreign Application Priority Data

Oct. 19, 2022 (KR) .......................... 10-2022-0134521

(51) Int. Cl.
*F24F 11/65* (2018.01)
*F24F 11/49* (2018.01)

(52) U.S. Cl.
CPC .............. *F24F 11/65* (2018.01); *F24F 11/49* (2018.01)

(58) Field of Classification Search
CPC .................................... F24F 11/49; F24F 11/65
See application file for complete search history.

(56) References Cited

U.S. PATENT DOCUMENTS

| | | | | |
|---|---|---|---|---|
| 10,323,878 B1 * | 6/2019 | Woolf | .................. | G05B 13/042 |
| 2009/0319090 A1 * | 12/2009 | Dillon | .................... | G06Q 50/06 |
| | | | | 700/291 |
| 2010/0063641 A1 * | 3/2010 | Scholten | .............. | H05B 47/175 |
| | | | | 700/287 |
| 2016/0258673 A1 * | 9/2016 | Apaydin | .............. | F25D 11/022 |
| 2021/0141346 A1 * | 5/2021 | Wenzel | ............... | G05B 13/041 |

(Continued)

FOREIGN PATENT DOCUMENTS

| | | |
|---|---|---|
| JP | 2001-289485 A | 10/2001 |
| JP | 2013-231533 A | 11/2013 |
| KR | 10-2013-0118662 A | 10/2013 |

(Continued)

*Primary Examiner* — Mohammad Ali
*Assistant Examiner* — Vincent W Chang
(74) *Attorney, Agent, or Firm* — Bridgeway IP Law Group, PLLC; Sang Ho Lee; Hyun Woo Shin

(57) ABSTRACT

A total energy management system for high energy efficiency of a logistics center includes: an energy management system (EMS) server for collecting real-time data associated with the logistics center, wherein the EMS server processes the real-time data and generates at least one of real-time temperature data, real-time humidity data, renewable energy data, and electric power data of the logistics center; and an artificial intelligence (AI) server for outputting at least one of temperature mapping data, defrosting time determination data, and an energy operation guide in the logistics center based on at least one of the real-time temperature data, the real-time humidity data, the renewable energy data, and the electric power data received from the EMS server, wherein the EMS server switches between a plurality of management modes having different operating conditions for the logistics center based on at least one of the temperature mapping data, the defrosting time determination data, and the energy operation guide received from the AI server.

4 Claims, 9 Drawing Sheets

(56) References Cited

U.S. PATENT DOCUMENTS

2021/0180806 A1\*  6/2021  Walsh ................ G05B 19/0425
2023/0152035 A1\*  5/2023  Jackson ............. G05B 19/4155
                                                         700/297

FOREIGN PATENT DOCUMENTS

| KR | 10-2018-0088936 A | 8/2018 |
| KR | 10-1917293 B1 | 1/2019 |
| KR | 10-2021-0041806 A | 4/2021 |
| KR | 10-2021-0056090 A | 5/2021 |
| KR | 10-2022-0106543 A | 7/2022 |

\* cited by examiner

AI-BASED TOTAL ENERGY MANAGEMENT SYSTEM FOR HIGH ENERGY EFFICIENCY OF LOGISTICS CENTER

CROSS-REFERENCE TO RELATED APPLICATION

This application claims priority to Korean patent application No. 10-2022-0134521 filed on Oct. 19, 2022, the entire disclosure of which is incorporated herein by reference.

FIELD OF THE DISCLOSURE

The present disclosure relates to an AI-based total energy management system for high energy efficiency of a logistics center, and more specifically, to an energy management system for a cold chain logistics center that is operated with high efficiency by organically switching management modes via an AI server based on real-time data collected at the cold chain logistics center.

BACKGROUND

As national income increases, the demand for food of better quality is increasing and the cold chain industry for this purpose is attracting attention. In particular, since not only is it difficult to handle fresh goods or various vaccines because they have very short shelf lives compared to general products and their storage temperatures are significantly different for each product, but also cold chain logistics centers consume a large amount of energy, there is a need for measures to improve the energy efficiency of cold chain logistics centers.

Existing cold chain logistics centers have operational methods that rely on the experience of managers. For example, there is a problem of having an unsystematic energy management system in that a manager locally measures the temperature of each area of the cold chain logistics center, then based on this, manually controls the operation of the heating, ventilation, and air conditioning (HVAC) system to be on and off, and performs defrosting periodically relying on the manager's personal experience (e.g., once/2 hours), and the lighting is always on for 24 hours, and workers or managers manually check whether there is docking, the proper temperature inside a loading box, etc., for the docking system as well.

SUMMARY OF THE DISCLOSURE

Technical Objects

Therefore, it is one object of the present disclosure to provide an energy management system for a cold chain logistics center that is operated with high efficiency by organically switching management modes of the cold chain logistics center based on real-time data collected at the cold chain logistics center.

However, the objects to be achieved by the present disclosure are not limited to those mentioned above, but may include objects that have not been mentioned but can be clearly understood by those having ordinary skill in the art to which the present disclosure pertains from the description below.

Technical Solution

In the following, specific means for achieving the objects of the present disclosure will be described.

A total energy management system for high energy efficiency of a logistics center in accordance with one embodiment of the present disclosure comprises: an energy management system (EMS) server for collecting real-time data associated with the logistics center, wherein the EMS server processes the real-time data and generates at least one of real-time temperature data, real-time humidity data, renewable energy data, and electric power data of the logistics center; and an artificial intelligence (AI) server for outputting at least one of temperature mapping data, defrosting time determination data, and an energy operation guide in the logistics center based on at least one of the real-time temperature data, the real-time humidity data, the renewable energy data, and the electric power data received from the EMS server, wherein the EMS server switches between a plurality of management modes having different operating conditions for the logistics center based on at least one of the temperature mapping data, the defrosting time determination data, and the energy operation guide received from the AI server.

According to the system, wherein the plurality of management modes comprises: a normal management mode configured to be applied to the logistics center in cases where a real-time data change of temperature-related data is less than a threshold, power consumption of the logistics center is less than or equal to a preset first trigger level, and no logistics volume change event is detected and no work schedule exists in the logistics center, wherein the temperature-related data comprise at least one of the temperature mapping data and the real-time temperature data; a work management mode configured to be applied to the logistics center in cases where the real-time data change of the temperature-related data is greater than or equal to the threshold, or the power consumption of the logistics center is greater than or equal to the preset first trigger level and less than or equal to a second trigger level higher than the first trigger level, or a logistics volume change event is detected or a work schedule exists in the logistics center; and a peak management mode configured to be applied to the logistics center in a case where the power consumption of the logistics center exceeds the preset second trigger level.

According to the system, wherein the logistics center comprises a heating, ventilation, and air conditioning (HVAC) system, a lighting system, and a defrosting system, wherein in the normal management mode, a set temperature range of a refrigeration system of the HVAC system is a first temperature range, and a set temperature range of a freezing system is a second temperature range, a set humidity range of the HVAC system is a first humidity range, a reference illuminance of the lighting system is a first illuminance, and the defrosting system operates according to a defrosting time determination received from the AI server, wherein in the work management mode, the set temperature range of the refrigeration system of the HVAC system is a third temperature range lower than the first temperature range, and the set temperature range of the freezing system is a fourth temperature range lower than the second temperature range, the set humidity range of the HVAC system is a second humidity range higher than the first humidity range, the reference illuminance of the lighting system is a second illuminance higher than the first illuminance, and the defrosting system operates according to the defrosting time determination received from the AI server, and wherein in the peak management mode, power of an energy storage system of the logistics center is supplied to the HVAC system or the HVAC system is turned off, the lighting system maintains the first illuminance only for some facilities of the logistics center, and the defrosting system operates to delay the defrosting time.

According to the system, wherein switching is effected between multiple AC/DC power supply modes of the logistics center based on the energy operation guide, and wherein the multiple AC/DC power supply modes comprise: a basic mode in which grid power and energy stored in an energy storage system are used at the same time; a best condition mode in which renewable energy power generation and the grid power are used at the same time when weather conditions around the logistics center are the best; and a maximum power save mode in which the grid power is not used, and the energy stored in the energy storage system and the renewable energy power generation are used when power consumption of the logistics center reaches a preset trigger level.

An energy management method for high energy efficiency of a logistics center in accordance with one embodiment of the present disclosure, performed by an energy management system (EMS) server, comprises: collecting real-time data associated with the logistics center, generating at least one of real-time temperature data, real-time humidity data, renewable energy data, and electric power data of the logistics center by processing the real-time data; receiving at least one of temperature mapping data, defrosting time determination data, and an energy operation guide in the logistics center from an artificial intelligence (AI) server, wherein at least one of the temperature mapping data, the defrosting time determination data, and the energy operation guide in the logistics center is generated based on at least one of the real-time temperature data, the real-time humidity data, the renewable energy data, and the electric power data; switching between a plurality of management modes having different operating conditions for the logistics center based on at least one of the temperature mapping data, the defrosting time determination data, and the energy operation guide.

Effects of the Disclosure

As described above, there are the following effects according to the present disclosure.

According to one embodiment of the present disclosure, since the management modes of the cold chain logistics center can be organically switched based on the real-time data collected, there are the effects of being able to operate the cold chain logistics center with high energy efficiency, as well as to reduce the burden of monitoring-related work on managers.

However, the effects that can be obtained by the present disclosure are not limited to those mentioned above, and other effects that have not been mentioned will be clearly understood by those having ordinary skill in the art to which the present disclosure pertains from the description below.

BRIEF DESCRIPTION OF THE DRAWINGS

As the following drawings attached hereto illustrate preferred embodiments of the present disclosure and serve to further understand the technical idea of the present disclosure in conjunction with the detailed description of the present disclosure, the present disclosure should not be construed as being limited only to what is set forth in such drawings.

DETAILED DESCRIPTION OF THE PREFERRED EMBODIMENTS

Figure 1:
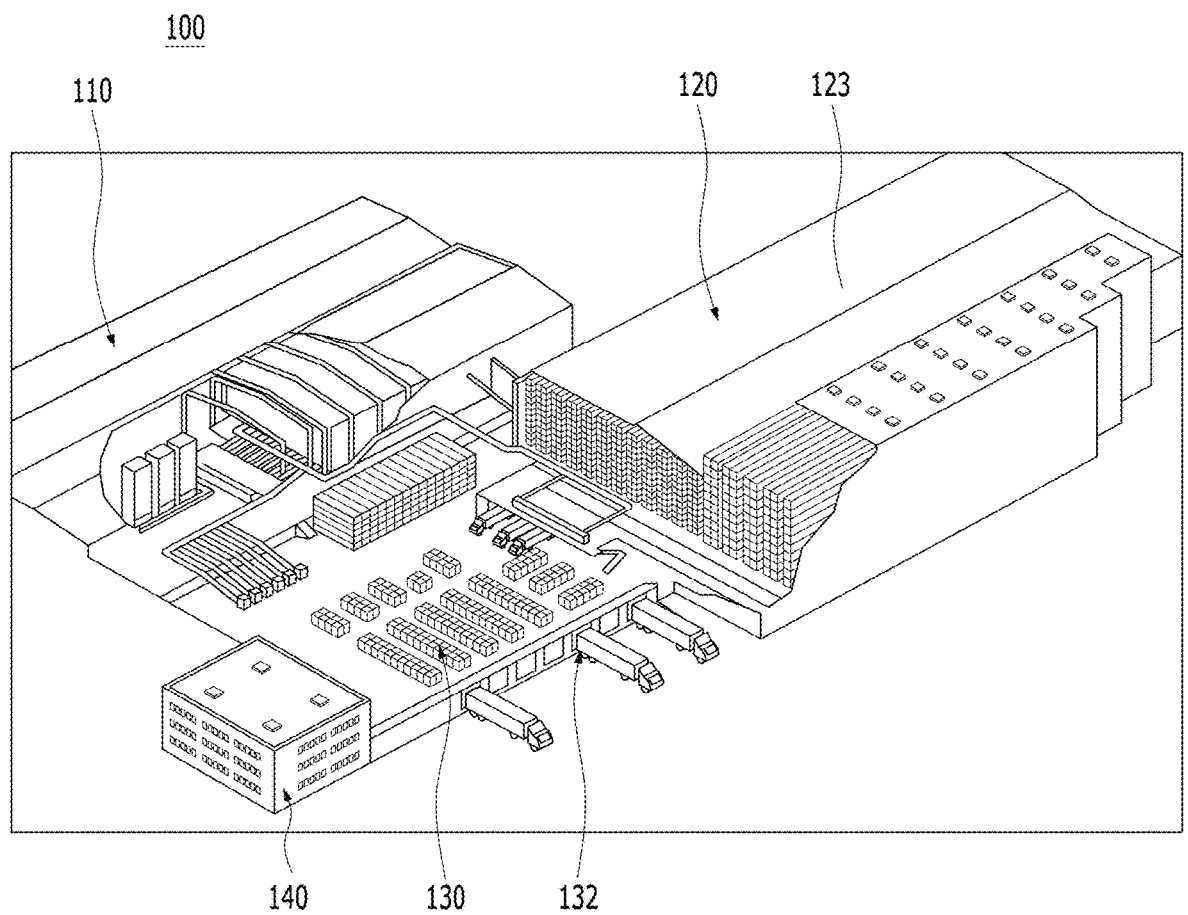
FIG. 1 is an example diagram of a cold chain logistics center in accordance with one embodiment of the present disclosure.

Hereinafter, embodiments into which those having ordinary skill in the art to which the present disclosure pertains can readily implement the present disclosure will be described in detail with reference to the accompanying drawings. However, the present disclosure may be embodied in a number of different forms and is not limited to the examples described herein. Moreover, in describing the operating principles of the preferred embodiments of the present disclosure in detail, if it is determined that the specific description of related known functions or configurations may unnecessarily obscure the subject matter of the present disclosure, the detailed description thereof will be omitted.

In addition, the same reference numerals are used throughout each drawing for parts having similar functions. Throughout the specification, when a certain part is connected to or is above/below another part, it includes not only a case in which it is directly connected or is above/below, but also a case in which it is indirectly connected or is above/below another part with still another element interposed therebetween.

The terminology used herein is for the purpose of describing a particular embodiment only and is not intended to be limiting of the invention. As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, although the terms "first," "second," or the like may be used herein to describe various elements, these elements should not be limited by these terms. These terms are only used to distinguish one element from another element. For example, a first element could be termed a second element, and, similarly, a second element could be termed a first element, without departing from the scope of the present disclosure. As used here, the term "and/or" includes any and all combinations of one or more of the associated listed items.

In addition, although the terms used in the present disclosure have been selected as commonly used terms in the technical field of the present disclosure, such terms may vary depending on the intention of a person skilled in the art, new judicial precedents, the emergence of new technology, and the like. Moreover, in a specific case, there is a term arbitrarily selected by the applicant, and in this case, the meaning thereof will be described in the corresponding part of the detailed description. Therefore, the term used in the present disclosure should be defined based on the meaning of the term and the overall content of the present disclosure, rather than simply the wording of the term.

Overview of Cold Chain Logistics Center

FIG. 1 is an example diagram of a cold chain logistics center in accordance with one embodiment of the present disclosure.

Referring to FIG. 1, a cold chain logistics center 100 may include a refrigerated storage area 110 for refrigerated storage of goods, a frozen storage area 120 for frozen storage of goods, a docking area 132 through which goods are carried in from the outside or carried out to the outside, a temporary storage area 130 in which goods that are to be carried in from the outside or carried out to the outside are temporarily stored, a control room 140 including an energy management system (EMS) server for managing the energy of the cold chain logistics center 100 and an artificial intelligence (AI) server.

The refrigerated storage area 110, the frozen storage area 120, and the temporary storage area 130 may include a heating, ventilation, and air conditioning (HVAC) system, a lighting system, and the like, and such an HVAC system and a lighting system may be controlled by the EMS server and AI server in the control room 140. This will be described in detail later.

In addition, a plurality of temperature sensors may be installed in the cold chain logistics center 100, and temperature measurement may be performed in real-time via the plurality of temperature sensors, and as a result, time-series temperature data may be generated. As will be described in detail later, such time-series temperature data may be processed by the EMS server in the control room 140 and converted into real-time temperature data. Further, the EMS server may transmit the real-time temperature data to the AI server, and the AI server may generate 3D temperature mapping data (temperature distribution data) via a 3D temperature mapping algorithm based on these real-time temperature data, and determine defrosting times in the cold chain logistics center via a defrosting time determination algorithm.

In addition, one or more humidity sensors may be installed in the cold chain logistics center 100, and humidity measurement may be performed in real-time via the humidity sensors, and as a result, time-series humidity data may be generated.

Furthermore, each of the refrigerated storage area 110 and the frozen storage area 120 may include a renewable energy power generation unit 123 for energy independence of the cold chain logistics center 100. The renewable energy power generation unit 123 serves to assist a grid power supply (AC power supply), and may supply power to the cold chain logistics center 100 together with the grid power supply or alone, depending on the energy management modes.

According to one embodiment, the renewable energy power generation unit 123 may include a photovoltaic (PV) module that converts solar energy into electrical energy by using a plurality of solar panels, and an energy storage system (ESS) module for storing electrical energy. However, the renewable energy power generation unit 123 may further include other renewable energy modules, for example, at least one of a wind energy power generation module, a hydro-energy power generation module, a solar heat energy power generation module, and a geothermal energy power generation module, in addition to the photovoltaic (PV) module, and is not limited to these.

The docking area 132 may include multiple docking stations through which goods can be carried in from the outside or carried out to the outside via freight vehicles, and the docking area 132 can minimize temperature/energy losses occurring during the docking process by using low-temperature IR technology and can minimize docking air intake based on fluid dynamics.

Total Energy Management System for Cold Chain Logistics Center

Figure 2:
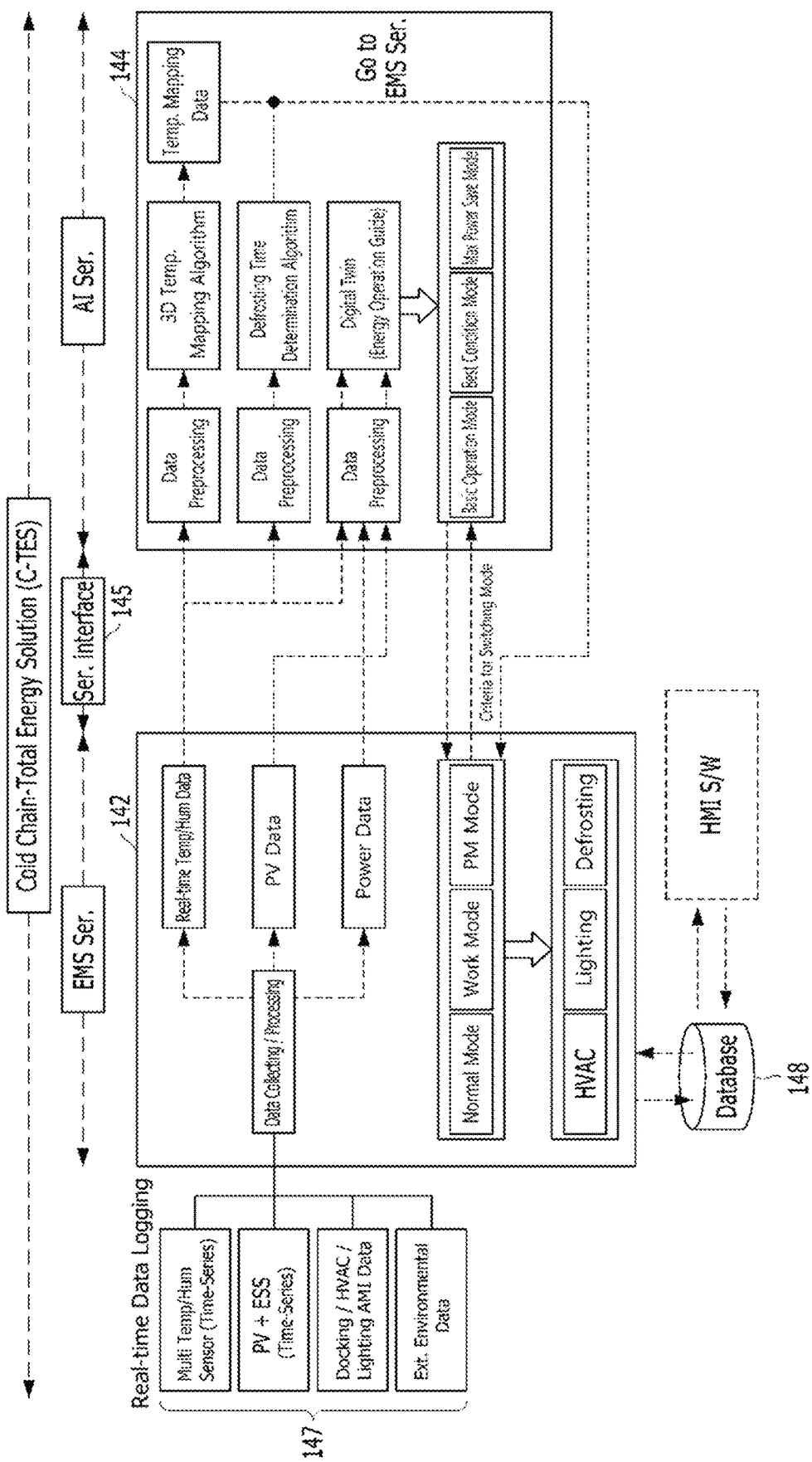
FIG. 2 is a diagram schematically showing a total energy management system for a cold chain logistics center in accordance with one embodiment of the present disclosure.

FIG. 2 is a diagram schematically showing a total energy management system for a cold chain logistics center in accordance with one embodiment of the present disclosure. According to one embodiment, the total energy management system for high energy efficiency of the cold chain logistics center may be installed in the control room 140 of FIG. 1, but is not limited in its installation location.

Referring to FIG. 2, the total energy management system for high energy efficiency of the cold chain logistics center may include an energy management system (EMS) server 142, an artificial intelligence (AI) server 144, and a server-to-server interface 145 between the two servers 142 and 144, and in addition, may include a database 148 or the like for storing real-time data 147 measured in real-time by a plurality of sensors in the cold chain logistics center, and various data, real-time data 147, and the like collected/processed by the EMS server 142.

The EMS server 142 in accordance with one embodiment may receive and collect real-time data 147 associated with the cold chain logistics center 100. The real-time data herein may include at least one of time-series temperature/humidity data from the plurality of temperature and humidity sensors inside and/or outside the cold chain logistics center 100, time-series renewable energy data from the renewable energy modules, external environmental data such as weather, humidity, temperature, etc., around the cold chain logistics center 100, data related to logistics volume change events in the docking area 132 of the cold chain logistics center 100, data related to the HVAC system of the cold chain logistics center 100, and lighting AMI (advanced metering infrastructure) data of the cold chain distribution center 100. However, the types or number of real-time data may vary depending on the sensors, facility infrastructure, or the like equipped in the cold chain logistics center, but is not limited therein.

In addition, the EMS server 142 may process the received real-time data, generate at least one of real-time temperature data, real-time humidity data, renewable energy data, and electric power data of the cold chain logistics center 100, and transmit the generated data to the AI server 144. Here, the real-time temperature data, real-time humidity data, renewable energy data, and electric power data generated by the EMS server 142 may be what have been converted into a form suitable to be utilized by the AI server 144 or for storage in a database, compared to the real-time data 147 in a raw state received by the EMS server 142.

The AI server 144 in accordance with one embodiment may output at least one of 3D temperature mapping data, defrosting time determination data, and an energy operation guide in the cold chain logistics center 100 based on at least one of the real-time temperature data, real-time humidity data, renewable energy data, and electric power data received from the EMS server 142.

According to a non-limiting example, the AI server 144 may preprocess the real-time temperature data received from the EMS server 142, and then input the preprocessed real-time temperature data to a 3D temperature mapping algorithm, and temperature mapping data may come out as the output.

The real-time temperature data processed/collected from the EMS server are based on the time-series temperature data detected from the plurality of temperature sensors inside and/or outside the cold chain logistics center 100. However, the plurality of temperature sensors measures the temperature at local locations where they are installed respectively. Therefore, the AI server 144 can construct a more efficient energy management system by generating temperature mapping data for all locations (or most locations) of the cold chain logistics center 100 rather than local locations via the 3D temperature mapping algorithm.

According to one embodiment, the 3D temperature mapping algorithm may be an application program that outputs temperature mapping data based on the data related to the structure (i.e., building structure data), the operating states of the HVAC system and the lighting system, and the like of the cold chain logistics center, and the temperature mapping data may be outputted based on rules pre-entered into such an application program.

According to another embodiment, since the structure and scale, the location and structure of the HVAC system and the lighting system, and the like are all different for each cold chain logistics center, the 3D temperature mapping algorithm is implemented via an artificial neural network module and a pre-learning session for such an artificial neural network module may be needed, in order to generate more precise temperature mapping data.

Figure 3:
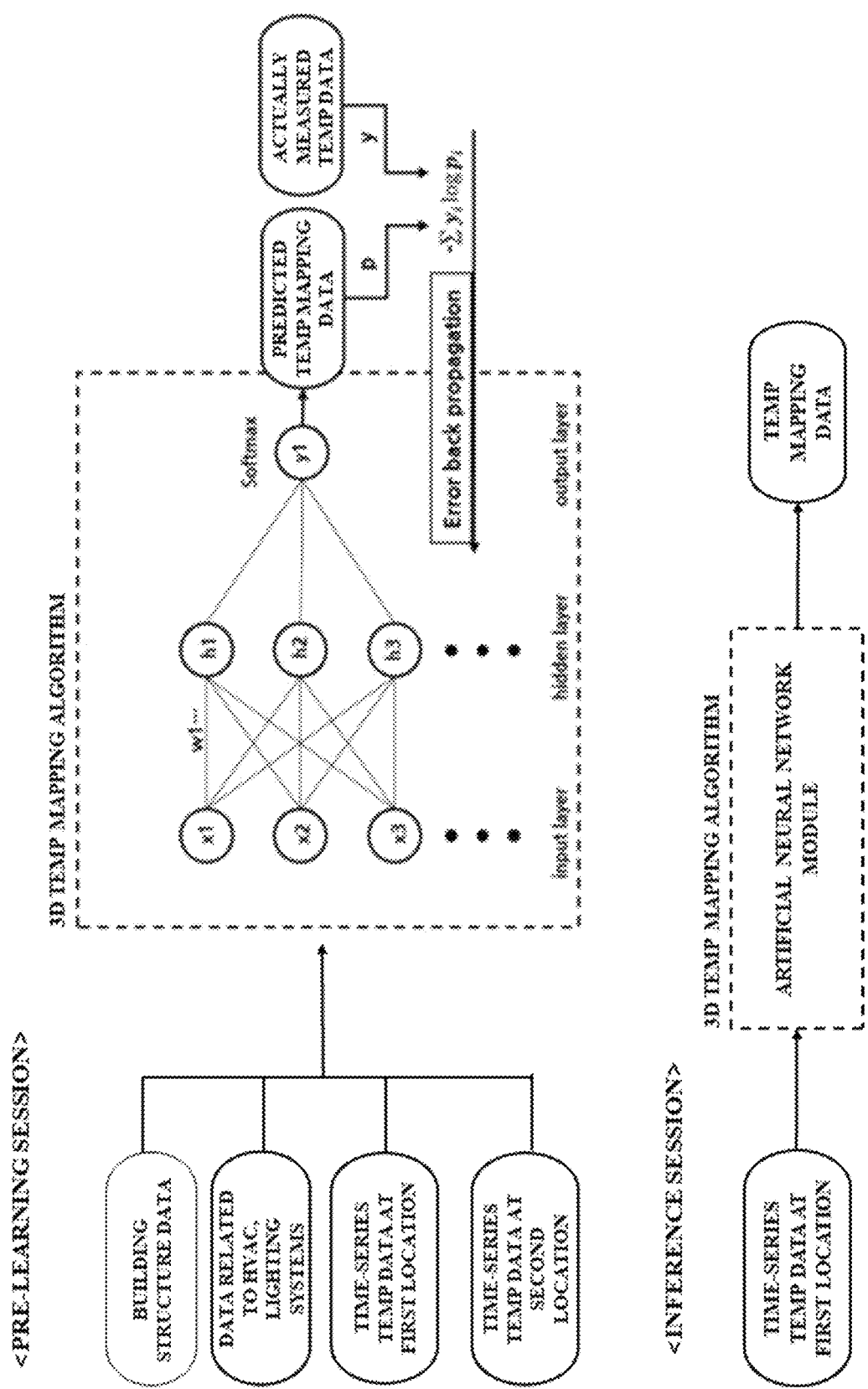
FIG. 3 is a diagram schematically showing a 3D temperature mapping algorithm based on an artificial neural network in accordance with one embodiment of the present disclosure.

FIG. 3 is a diagram schematically showing a 3D temperature mapping algorithm based on an artificial neural network in accordance with one embodiment of the present disclosure.

Referring to FIG. 3, in the pre-learning session for implementing the 3D temperature mapping algorithm by using the artificial neural network module, at the 3D temperature mapping algorithm, building structure data of the cold chain logistics center, data related to the HVAC/lighting systems, time-series temperature data detected by first temperature sensors at a first location finally installed in the cold chain logistics center, and time-series temperature data detected by second temperature sensors temporarily installed at a second location of the cold chain logistics center for the pre-learning session may be inputted into the artificial neural network of the 3D temperature mapping algorithm. By additionally installing the second temperature sensors in the pre-learning process, there is an effect of facilitating the accuracy and data accumulation of the pre-learning session.

And the artificial neural network module may output predicted temperature mapping data in the pre-learning session. Then, the predicted temperature mapping data may be compared with actually measured temperature data. As one example, temperature data at a particular location of the temperature mapping data may be compared with temperature data actually measured at the same particular location. In addition, the artificial neural network module may have a loss function configured in a direction in which errors between the predicted temperature mapping data and the actually measured temperature data are minimized (e.g., in a binary cross entropy method) and may be pre-learned. In other words, the artificial neural network module may employ a method of updating the weight of each layer of the artificial neural network module based on the loss function between the two pieces of temperature data. Once the pre-learning session is over, the temporarily installed second temperature sensors may be removed. However, the pre-learning session as described above is merely illustrative, and there is no limitation on the method of pre-learning. For example, the pre-learning session may also proceed without having the second temperature sensors installed temporarily.

The artificial neural network module described above may use at least one of a convolution neural network (CNN) module, a transformer module, a recurrent neural network (RNN) module, a multiple perceptron module, and a generative adversarial network (GAN) module, and there is no limitation therein.

Further, according to a non-limiting example, the AI server 144 may preprocess the real-time temperature data received from the EMS server 142, and then input the preprocessed real-time temperature data to a defrosting time determination algorithm, and defrosting time determination data may come out as the output.

At this time, the real-time temperature data inputted into the defrosting time determination algorithm may be temperature data detected from a temperature sensor installed in a heat exchanger. In addition, the defrosting time determination data outputted by the defrosting time determination algorithm may include data on the time point to perform defrosting and the time required for defrosting.

In another embodiment, the defrosting time determination algorithm may output defrosting time determination data based on not only preprocessed real-time temperature data but also real-time frosting analysis data detected from an image sensor or the like.

Defrosting work in conventional cold chain logistics centers was generally done by relying on the personal experience of managers, but in the case of the energy management system for a cold chain logistics center in accordance with one embodiment of the present disclosure, defrosting time determination is made possible through data analysis by introducing a defrosting time determination algorithm.

Moreover, according to a non-limiting example, the AI server 144 may preprocess the renewable energy data and electric power data received from the EMS server 142 and input the preprocessed data into a digital twin. This digital twin is a technology that predicts the results in advance by creating a twin in the virtual reality world for the cold chain logistics center (i.e., implementing the cold chain logistics center identically in the virtual reality world), and simulating situations that can occur in the cold chain logistics center in reality with a computer.

According to one embodiment, electric power consumption and renewable energy power generation and consumption in the cold chain logistics center can be predicted and real-time load usage can be monitored by using simulations via the digital twin. And by comparing these predictions and monitoring results, the digital twin can generate and output an energy operation guide. The energy operation guide may provide guidance related to the energy management of the cold chain logistics center. For example, through the energy operation guide, it is possible to determine whether to switch the energy management mode or power supply mode in the cold chain logistics center, and set a threshold for real-time data change of temperature-related data necessary for switching management modes, a first trigger level and a second trigger level for power consumption, and the like as well.

Figure 4:
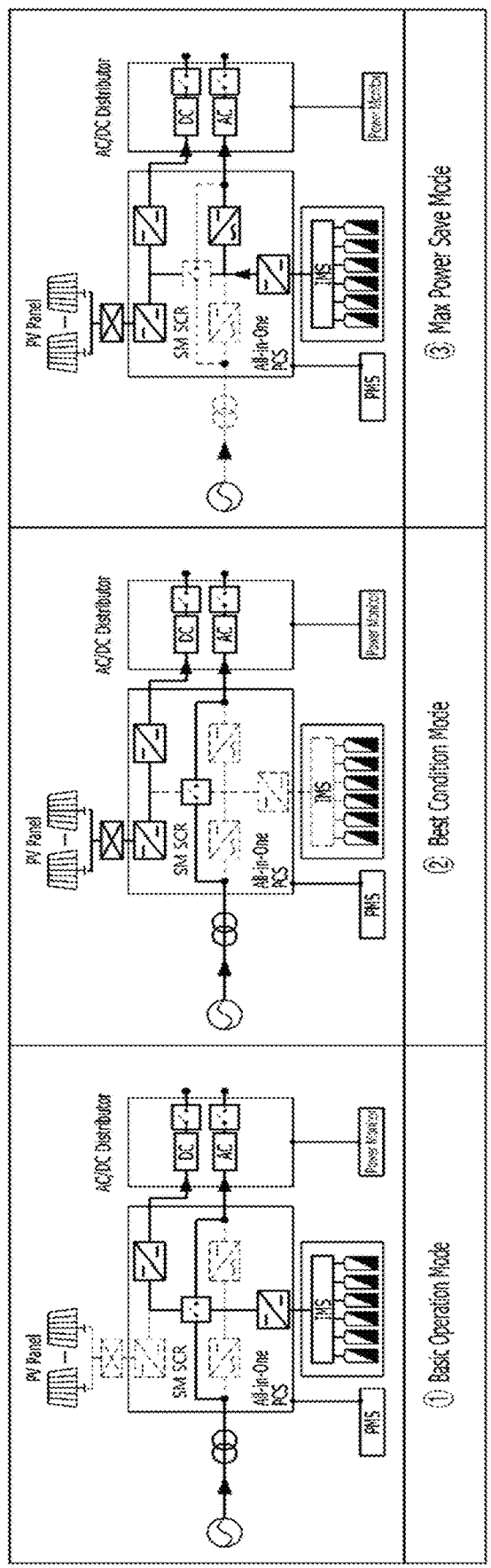
FIG. 4 is a diagram showing AC/DC power supply modes of a cold chain logistics center in accordance with one embodiment of the present disclosure.

FIG. 4 is a diagram showing AC/DC power supply modes of a cold chain logistics center in accordance with one embodiment of the present disclosure. Referring to FIG. 4, according to one embodiment, switching between multiple AC/DC power supply modes of the cold chain logistics center can be effected through the energy operation guide generated by the digital twin. This switching can be performed by an all-in-one power conditioning system (PCS), but is not limited thereto.

The multiple AC/DC power supply modes in accordance with one embodiment may include a [basic mode] in which grid power and the energy stored in the ESS (energy storage system) or UPS batteries are used at the same time, a [best condition mode] in which renewable energy power generation (in particular, PV power generation) and grid power are used at the same time when the weather conditions around the cold chain logistics center are the best (e.g., when the amount of sunlight, air volume, etc., are greater than or equal to a preset value), and a [maximum power save mode] in which grid power is not used, but the energy stored in the ESS (energy storage system) or UPS batteries and renewable energy power generation are used when the real-time electric power usage approaches the contracted capacity with Korea Electric Power Corp. (KEPCO) (or contracted capacities with other electric power suppliers) or the electric power consumption predicted via the digital twin approaches the threshold based on the energy operation guide.

Referring back to FIG. 2, according to one embodiment, the EMS server 142 may receive the temperature mapping data, the defrosting time determination data, and the energy operation guide from the AI server 144, and based on these, the EMS server 142 may perform switching between the multiple (energy) management modes of the cold chain logistics center, thereby controlling the operation of at least one of the HVAC system, the lighting system, and the defrost system.

Here, the multiple management modes of the cold chain logistics center may include a [normal management mode] applied to the cold chain logistics center in a case where real-time data changes of temperature, power consumption, and logistics volume are small, a [work management mode] applied to the cold chain logistics center in a case where the real-time data changes of temperature, power consumption, and logistics volume are large (e.g., larger than the threshold), and a [peak management mode] applied to the cold chain logistics center in a case where the real-time electric power usage approaches the contracted capacity with Korea Electric Power Corp. (KEPCO) or the electric power consumption predicted via the digital twin approaches the threshold.

Figure 5A:
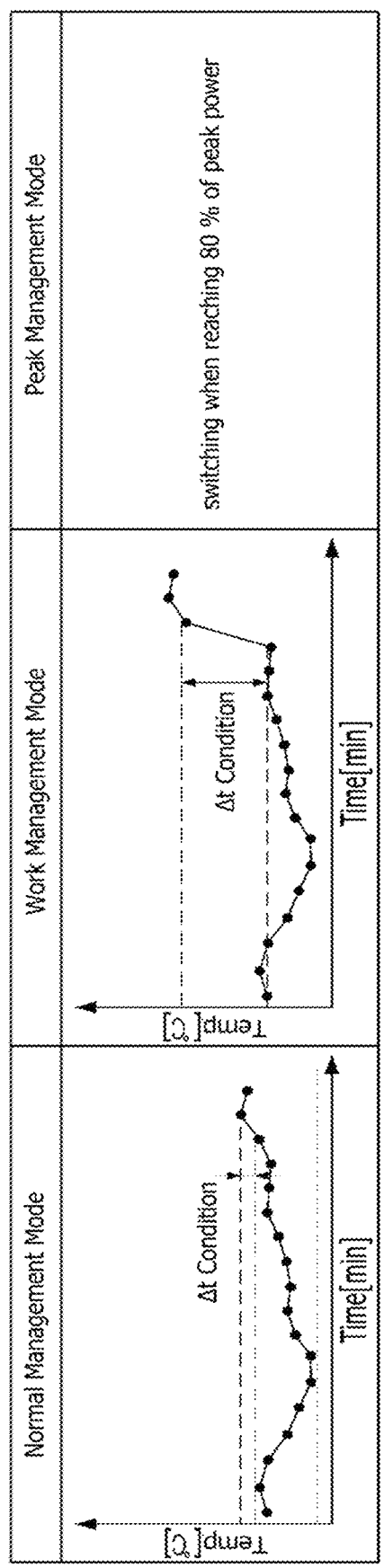
FIG. 5A is a diagram showing the switching between energy management modes of a cold chain logistics center according to temperature conditions in accordance with one embodiment of the present disclosure.
Figure 5B:
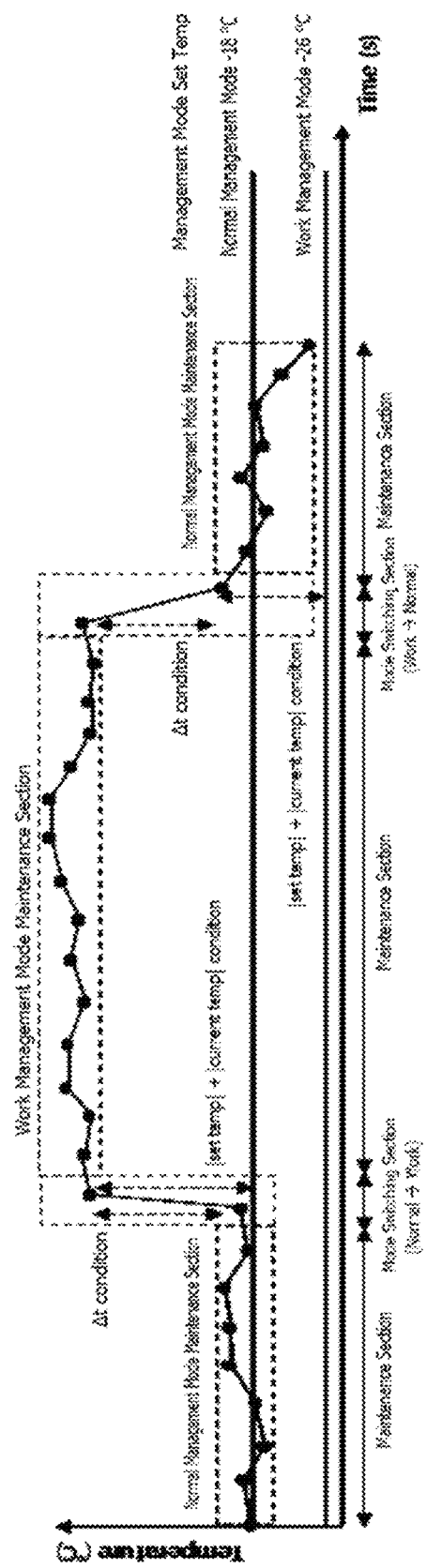
FIG. 5B is a diagram showing the switching between energy management modes of a cold chain logistics center according to temperature conditions in accordance with another embodiment of the present disclosure.
Figure 6:
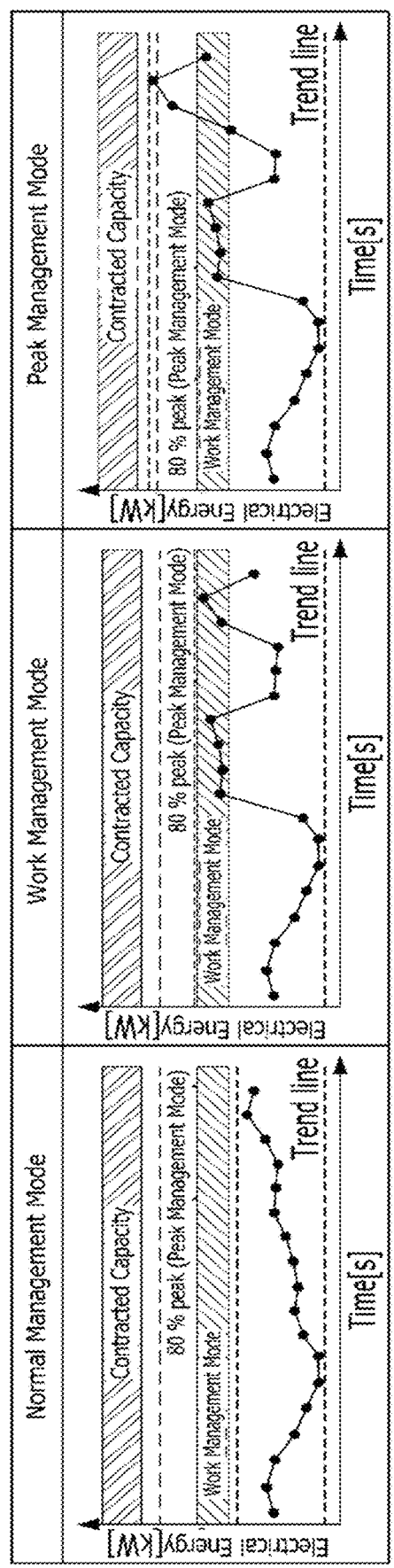
FIG. 6 is a diagram showing the switching between energy management modes of a cold chain logistics center according to power consumption conditions in accordance with one embodiment of the present disclosure.

FIGS. 5A to 6 are diagrams showing the switching between energy management modes of a cold chain logistics center according to temperature conditions and power consumption conditions in accordance with one embodiment of the present disclosure.

Referring to FIG. 5A, it can be seen that the normal management mode is applied to the cold chain logistics center when the change in temperature-related data (including at least one of real-time temperature data and temperature mapping data) is lower than a threshold, and then, the work management mode is applied to the cold chain logistics center when the change in temperature-related data becomes greater than or equal to the threshold.

In addition, if switched from the normal management mode to the work management mode, the work management mode is maintained for a preset period of time (e.g., 5 minutes), and if there is no change in temperature-related data greater than or equal to the threshold during the corresponding period in the work management mode, a switching can be made back to the normal management mode. The changes in such temperature-related data may be measured periodically or measured in a real-time differential method, and there are no limitations on the measurement methods thereof.

On the other hand, regardless of the changes in temperature-related data, the cold chain logistics center may be switched to the peak management mode when a preset percentage of peak power (e.g., 80% of the peak power) is reached.

Referring to FIG. 6, the normal management mode may be applied to the cold chain logistics center when the power consumption of the cold chain logistics center is less than or equal to a preset first trigger level. And when the power consumption becomes greater than or equal to the preset first trigger level but less than a second trigger level, which is higher than the first trigger level, the cold chain logistics center can be switched from the normal management mode to the work management mode. In addition, if switched from the normal management mode to the work management mode, the work management mode may be maintained for a preset period of time (e.g., 5 minutes), and the management mode may be switched according to the data of real-time electric power amount size. Furthermore, when the power consumption becomes greater than or equal to the second trigger level (e.g., 80% of the peak power), the cold chain logistics center may be switched to the peak management mode.

Further, in relation to the logistics volume conditions, the normal management mode usually applies to the cold chain logistics center, but when a logistics volume change event in which goods are carried in from the outside or carried out to the outside is detected, the cold chain logistics center may be switched to the work management mode.

In addition, if there is no work schedule present in the cold chain logistics center, the normal management mode may be applied to the cold chain logistics center, and then the work management mode may be applied during a period that work schedule is present.

Putting together what is described above, the normal management mode may be applied to the cold chain logistics center in the cases where the real-time data change of temperature is less than the threshold, the power consumption is less than or equal to the preset first trigger level, no logistics volume change event is detected, and no work schedule exists.

Further, the work management mode may be applied to the cold chain logistics center in the cases where the real-time data change of temperature is greater than or equal to the threshold, or the power consumption is greater than or equal to the preset first trigger level and less than or equal to the second trigger level higher than the first trigger level, or a logistics volume change event is detected, or a work schedule exists.

In addition, the peak management mode may be applied to the cold chain logistics center when the power consumption exceeds the preset second trigger level.

In other words, the operation and switching conditions of the normal management mode/work management mode and the peak management mode are different from each other in that the normal management mode and the work management mode are switched based on the temperature/humidity, power consumption, and logistics volume, whereas the peak management mode is switched only on whether the power consumption has reached the second trigger level (e.g., contracted capacity with KEPCO).

Further, if the multiple management modes and AC/DC power supply modes applied to the cold chain logistics center are combined and described, in the case where the management mode is the normal management mode and the work management mode, the basic mode or the best condition mode may be selectively used as the AC/DC power supply mode, and in the case where the management mode is the peak management mode, the maximum power save mode may be used as the AC/DC power supply mode. However, the relationship between the management modes and the power supply modes is not limited.

According to one embodiment of the present disclosure, a cold chain logistics center includes a heating, ventilation, and air conditioning (HVAC) system, a lighting system, and a defrosting system. And the EMS server 142 may operate as shown in Table 1 below in each management mode.

7° C., the set temperature range of the freezing system is a fourth temperature range lower than the second temperature range, for example, −26° C. to −20° C., the set humidity range is a second humidity range (greater than the first humidity range), for example, 50% or more, the reference illuminance of the lighting system is a second illuminance higher than the first illuminance, for example, 150 lx, and the defrosting system may operate with the defrosting time determination data received from the AI server.

Moreover, in the peak management mode of the cold chain logistics center, the ESS power is supplied to the HVAC system or the power supply is turned off, the lighting system may maintain the first illuminance, for example, 75 lx, for only some facilities of the cold chain logistics center, and the defrosting system may operate to delay the defrosting time.

As described above, the energy management system of the cold chain logistics center in accordance with the present disclosure can organically switch the management modes of the cold chain logistics center based on the real-time data collected, and thus, can operate the cold chain logistics center with high energy efficiency, as well as reduce the burden of monitoring-related work on managers.

FIG. 5B is a diagram showing the switching between energy management modes of a cold chain logistics center according to temperature conditions in accordance with another embodiment of the present disclosure.

TABLE 1

| Category | | Normal management mode | Work management mode | Peak management mode |
| --- | --- | --- | --- | --- |
| To be controlled | HVAC | [Operating temperature conditions] Refrigeration range: 7 to 10° C. Freezing range: −20 to −18° C. Apply HVAC operation logic linked with 3D temperature mapping [Operating humidity conditions] 40% or lower | [Operating temperature conditions] Refrigeration range: 5 to 7° C. Freezing range: −26 to 20° C. Apply HVAC operation logic linked with 3D temperature mapping [Operating humidity conditions] 50% or higher | Power supply with ESS or turn entire HVAC off |
| | Lighting | Reference illuminance of 75 [lx] controlled | Reference illuminance of 150 [lx] fixed | Illuminance for facilities other than freezing/refrigeration of 75 [lx] fixed (controlled at 80% of peak power) |
| | Defrosting | Operation according to an algorithm to determine whether to perform defrosting | Operation according to an algorithm to determine whether to perform defrosting | Defrosting operation control (Time delay) |

In other words, in the normal management mode of the cold chain logistics center, the set temperature range of a refrigeration system of the HVAC system is a first temperature range, for example, 7° C. to 10° C., the set temperature range of a freezing system is a second temperature range, for example, −20° C. to −18° C., the set humidity range is a first humidity range, for example, 40% or lower, the reference illuminance of the lighting system is a first illuminance, for example, 75 lx, and the defrosting system may operate with the defrosting time determination data received from the AI server.

Further, in the work management mode of the cold chain logistics center, the set temperature range of the refrigeration system of the HVAC system is a third temperature range lower than the first temperature range, for example, 5° C. to There is a difference in that the energy management mode is switched depending on whether the change in temperature-related data is greater than or equal to the threshold in the embodiment of FIG. 5A described above, whereas the conditions at the time of switching the energy management mode according to temperature conditions are further subdivided in the embodiment of FIG. 5B.

Specifically, referring to FIG. 5, it can be seen that the energy management mode is switched only when a first condition for the change in temperature-related data of the cold chain logistics center, and a second condition of comparing the sum of the absolute values of the set temperature in the energy management mode and the current temperature with a predetermined value are simultaneously satisfied, and otherwise, the current energy management mode is maintained as it is. In the following, conditions for switching the energy management mode in the embodiment according to FIG. 5B will be described in greater detail with reference to Table 2.

TABLE 2

| Category | Normal management mode | Work management mode |
|---|---|---|
| Switching conditions | <Conditions for maintaining normal management mode><br>① Δ|t| ≤ A<br>② |Set temperature $t_{Normal}$| + |Current temperature| ≥ B<br><Conditions for switching from normal management mode to work management mode><br>① Δ|t| ≥ A + 1<br>② |Set temperature $t_{Normal}$| + |Current temperature| ≤ B − 1 | <Conditions for maintaining work management mode><br>① Δ|t| ≤ A<br>② |Set temperature $t_{Work}$| + |Current temperature| ≤ C (>B)<br><Conditions for switching from work management mode to normal management mode><br>① Δ|t| ≥ A + 1<br>② |Set temperature $t_{Work}$| + |Current temperature| ≥ C + 1 |

Notes
If only one of the two switching conditions is met, the current energy management mode is maintained.

First, in the conditions for maintaining the normal management mode, a first condition is that the change in temperature-related data Δ|t| (e.g., the difference between the temperature $t_{pre}$ measured immediately before and the temperature $t_{suc}$ measured subsequently is referred to as Δt) is less than or equal to a first predetermined value (e.g., A=3), and a second condition is a case where the sum of the absolute values of the set temperature in the normal management mode (e.g., the set temperature $t_{Normal}$=−18° C. in the normal management mode) and the current temperature is greater than or equal to a second predetermined value (e.g., B=33).

In the case of the switching conditions for switching from the normal management mode to the work management mode, a first condition is that the change in temperature-related data Δ|t| is greater than or equal to a third predetermined value (e.g., A+1=4), and a second condition is a case where the sum of the absolute values of the set temperature in the normal management mode (e.g., the set temperature $t_{Normal}$=−18° C. in the normal management mode) and the current temperature is less than or equal to a fourth predetermined value (e.g., B−1=32). If both the first condition and the second condition are satisfied in the switching conditions, the energy management mode of the cold chain logistics center can be switched from the normal management mode to the work management mode.

Further, in the conditions for maintaining the work management mode, a first condition is that the change in temperature-related data Δ|t| is less than or equal to the first predetermined value (e.g., A=3), and a second condition is a case where the sum of the absolute values of the set temperature in the work management mode (e.g., the set temperature $t_{Work}$=−26° C. in the work management mode) and the current temperature is less than or equal to a fifth predetermined value (e.g., C=40). In this case, the fifth predetermined value may be greater than the second predetermined value.

In the case of the switching conditions for switching from the work management mode to the normal management mode, a first condition is that the change in temperature-related data Δ|t| is greater than or equal to the third predetermined value (e.g., A+1=4), and a second condition is a case where the sum of the absolute values of the set temperature in the work management mode (e.g., the set temperature $t_{Work}$=−26° C. in the work management mode)

and the current temperature is greater than or equal to a sixth predetermined value (e.g., C+1=41). If both the first condition and the second condition are satisfied in the switching conditions above, the energy management mode of the cold chain logistics center can be switched from the work management mode to the normal management mode.

However, the switching of the energy management modes of the cold chain logistics center based on the temperature-related data described in FIG. 5B is merely illustrative, and variously modified switching conditions may be applied.

Figure 7:
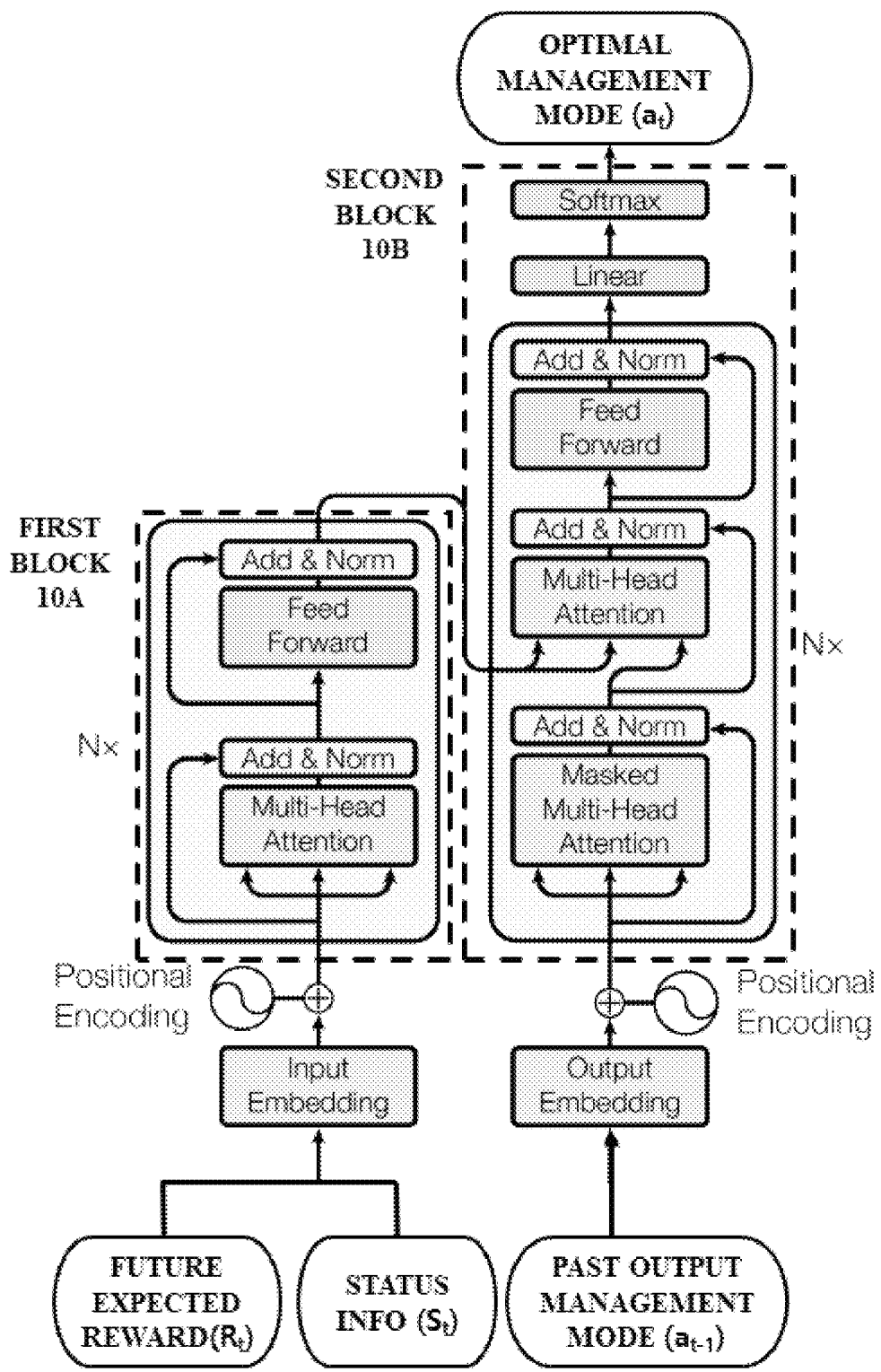
FIG. 7 is a diagram schematically showing a transformer-based artificial neural network module for determining a management mode of a cold chain logistics center in accordance with one embodiment of the present disclosure.

Method for Determining Management Mode Using Reinforcement Learning for Transformer-Based Artificial Neural Network FIG. 7 is a diagram schematically showing a transformer-based artificial neural network module for determining a management mode of a cold chain logistics center in accordance with one embodiment of the present disclosure.

Referring to FIG. 7, the AI server 144 may include a transformer-based artificial neural network module 10, and may output an optimal management mode of the cold chain logistics center via reinforcement learning by using such an artificial neural network module 10.

A future expected reward $R_t$, status information of the cold chain logistics center $S_t$, and a past output management mode $a_{t-1}$, which is the result previously outputted from the artificial neural network module 10, can be inputted into the transformer-based artificial neural network module 10.

Here, the future expected reward $R_t$ represents the total amount of rewards expected in the future by taking a particular action in the cold chain logistics center as a return to go, i.e., by selecting one of the multiple management modes in the cold chain logistics center. For example, it may be designed such that a reward is given to the cold chain logistics center being able to perform high-efficiency energy management without entering the peak management mode (i.e., when the predetermined energy consumption is less than the threshold), and no or less reward is given for other situations. Such future expected reward $R_t$ may also be based on power consumption prediction via the digital twin, or the like.

The status information of the cold chain logistics center $S_t$ may include information on the cold chain logistics center, including real-time temperature data, renewable energy data, and electric power data received by the AI server 144 from the EMS server 142. Alternatively, the status information of the cold chain logistics center $S_t$ may also include temperature mapping data and an energy operation guide generated by the 3D temperature mapping algorithm, defrosting time determination algorithm, digital twin, and so on, based on the real-time temperature data, renewable energy data, and electric power data received from the EMS server 142.

The past output management mode $a_{t-1}$ represents a management mode previously outputted from the transformer-based artificial neural network module 10 when the inputs/outputs to/from the transformer-based artificial neural network module 10 are made in real-time or in chronological order.

In this way, when the future expected reward $R_t$, status information of the cold chain logistics center $S_t$, and past output management mode $a_{t-1}$ are inputted into the transformer-based artificial neural network module 10, the transformer-based artificial neural network module 10 may output an optimal management mode $a_t$ to be selected at the present time in the cold chain logistics center.

In the following, a process of processing input data and outputting result values via the transformer-based artificial neural network module 10 will be described.

Referring to FIG. 7, according to one embodiment of the present disclosure, a transformer-based artificial neural network module 10 for determining a management mode of a cold chain logistics center may include a first block 10*a* (e.g., an encoder) and a second block 10*b* (e.g., a decoder).

The future expected reward $R_t$ and the status information of the cold chain logistics center $S_t$ may be inputted into the first block 10*a* of the artificial neural network module 10. And the future expected reward $R_t$ and the status information of the cold chain logistics center $S_t$ inputted in this way are inputted into an embedding module of the first block 10*a* and vectorized to thereby output embedding information. Then, the bundle of outputted embedding information is linearly embedded through different linear layers and is configured into Q (Query feature), K (Key feature), and V (Value feature) including feature dimensions, and then Q (Query feature), K (Key feature), and V (Value feature) can be used as input data to the multi-head attention layer. Q, K, and V may be generated from the embedding information through different linear embeddings. Q and K are inputted as input data for the 1st MatMul operation, the similarity of all K with Q is computed through the scale and softmax operations and a similarity vector between a series of embedding information is outputted, and this similarity vector and V may be inputted as input data for the 2nd MatMul operation. And the multi-head attention layer may output attention information based on the inputted Q, K, and V values and input it to the feed-forward layer. These multi-head attention layers and feed-forward layers may be repeated N times, and the repetition may be made in such a way that the encoding information outputted from the previous feed-forward layer serves to be input to the next multi-head attention layer. And the last feed-forward layer may output the final encoding information, and such final encoding information may be inputted as K (Key) and V (Value) values to the second multi-head attention layer of the second block 10*b* of the transformer-based artificial neural network module 10.

Further, the past output management mode $a_{t-1}$ may be inputted into the second block 10*b* of the transformer-based artificial neural network module 10. Here, the past output management mode $a_{t-1}$ is inputted into an embedding module of the second block 10*b* and vectorized to thereby output embedding information, the bundle of outputted embedding information is linearly embedded through different linear layers and is configured into Q (Query feature), K (Key feature), and V (Value feature) including feature dimensions, and then Q (Query feature), K (Key feature), and V (Value feature) can be used as input data to the first multi-head attention layer. And the first multi-head attention layer can output a Q (Query) value, which is inputted to the second multi-head attention layer. The second multi-head attention layer may receive as input the final encoding information from the first block 10*a* as K and V values. And the second multi-head attention layer may output attention information based on the inputted Q, K, and V values and input it to the feed-forward layer. The first multi-head attention layer, the second multi-head attention layer, and the feed-forward layers may be repeated N times, and the repetition may be made in such a way that the decoding information outputted from the previous feed-forward layer serves to be input to the next first multi-head attention layer. And the last feed-forward layer may output the final decoding information, this final decoding information passes through the linear layer and the softmax layer, and the transformer artificial neural network module 10 may output an optimal management mode $a_t$ to be selected at the present time in the cold chain logistics center.

However, specific implementation methods of the transformer-based artificial neural network module 10 as described above may vary diversely and are not limited thereto.

Energy Management Method for Cold Chain Logistics Center

Figure 8:
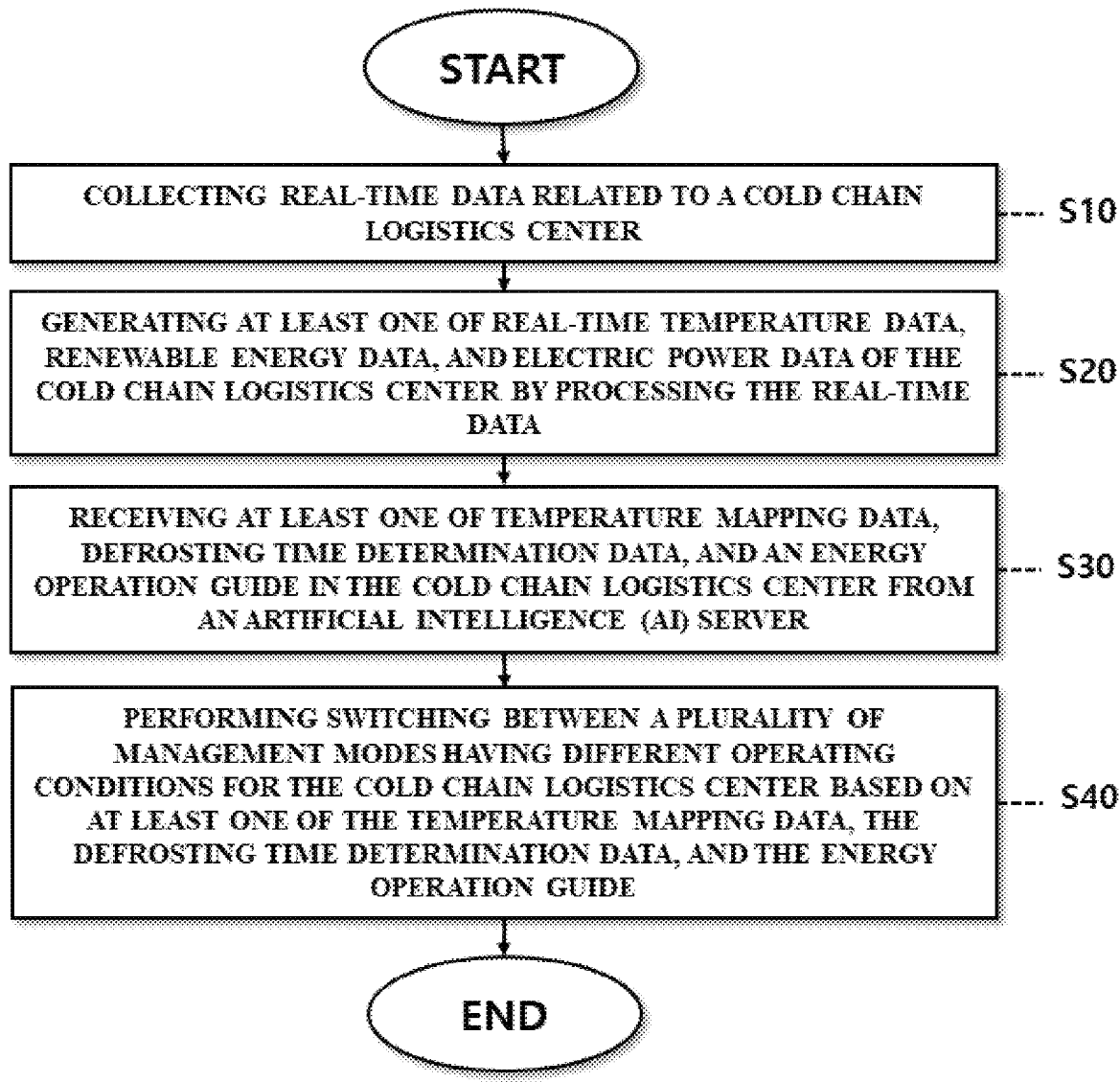
FIG. 8 is a flowchart of an energy management method for high energy efficiency of a cold chain logistics center in accordance with one embodiment of the present disclosure.

FIG. 8 is a flowchart of an energy management method for high energy efficiency of a cold chain logistics center in accordance with one embodiment of the present disclosure.

Referring to FIG. 8, first, in step S10, the EMS server may collect real-time data associated with the cold chain logistics center. The real-time data herein may include at least one of time-series temperature data from the plurality of temperature sensors inside and/or outside the cold chain logistics center, time-series renewable energy data from the renewable energy modules, external environmental data such as weather, humidity, temperature, etc., around the cold chain logistics center, data related to logistics volume change events in the docking area of the cold chain logistics center, data related to the heating, ventilation, and air conditioning (HVAC) system of the cold chain logistics center, and lighting AMI (advanced metering infrastructure) data of the cold chain distribution center.

In step S20, the EMS server may process the real-time data and generate at least one of real-time temperature data, renewable energy data, and electric power data of the cold chain logistics center.

In step S30, the EMS server may receive at least one of temperature mapping data, defrosting time determination data, and an energy operation guide in the cold chain logistics center from the artificial intelligence (AI) server. Here, the AI server may generate at least one of temperature mapping data, defrosting time determination data, and an energy operation guide in the cold chain logistics center based on at least one of the real-time temperature data, renewable energy data, and electric power data received from the EMS server.

In step S40, switching between a plurality of management modes having different operating conditions for the cold chain logistics center can be performed based on at least one of the temperature mapping data, defrosting time determination data, and energy operation guide.

As one non-limiting example, the plurality of management modes may include a normal management mode, a work management mode, and a peak management mode.

The normal management mode may be applied to the cold chain logistics center in the cases where the real-time data change of temperature is less than the threshold, the power consumption is less than or equal to the preset first trigger level, no logistics volume change event is detected, and no work schedule exists.

The work management mode may be applied to the cold chain logistics center in the cases where the real-time data change of temperature is greater than or equal to the threshold, or the power consumption is greater than or equal to the preset first trigger level and less than or equal to the second trigger level higher than the first trigger level, or a logistics volume change event is detected, or a work schedule exists.

The peak management mode may be applied to the cold chain logistics center when the power consumption exceeds the preset second trigger level.

Computer Readable Recording Medium

It is apparent that each step or operation of the method according to the embodiments of the present disclosure may be performed by a computer including one or more processors according to the execution of a computer program stored in a computer-readable recording medium.

The computer-executable instructions stored in the computer-readable recording medium may be implemented through a computer program programmed to perform each corresponding step, but such computer program may be stored in the computer-readable recording medium, and it is executable by a processor. The computer-readable recording medium may be a non-transitory readable medium. In this case, the non-transitory readable medium refers to a medium that stores data semi-permanently and can be read by a machine, which is different from a medium that stores data temporarily, such as a register, cache, memory, etc. Specifically, programs for performing the various methods described above may be provided while stored in a non-transitory readable medium such as semiconductor memory devices such as erasable programmable read-only memory (EPROM), electrically erasable programmable read-only memory (EEPROM), and flash memory devices, a magnetic disk such as internal hard disks and removable disks, an optical-magnetic disk, and a non-volatile memory including a CD-ROM and a DVD-ROM disk.

Methods according to the embodiments disclosed in the present disclosure may be provided by being included in a computer program product. The computer program product may be distributed in the form of a machine-readable storage medium (e.g., compact disc read only memory (CD-ROM)) or via online through an application store (e.g., Play Store™). In case of online distribution, at least part of the computer program product may be temporarily stored or temporarily generated in a storage medium such as a memory of a server of a manufacturer, a server of an application store, or a relay server.

Those skilled in the art to which the present disclosure pertains will be able to understand that the present disclosure may also be conducted in other specific forms without changing the technical spirit or essential features thereof. Therefore, the embodiments of the present disclosure are to be understood in all respects as illustrative and not restrictive. The scope of the present disclosure is presented by the following claims rather than the detailed description, and all changes or modifications derived from the meaning and scope of the claims and equivalent concepts thereof should be construed as being included in the scope of the present disclosure.

The features and advantages described herein are not all inclusive, and many additional features and advantages will become apparent to those skilled in the art, particularly upon consideration of the drawings, the specification, and the claims. Moreover, it should be noted that the language used herein has been selected primarily for the purpose of readability and explanation and has not been selected to limit the subject matter of the present disclosure.

The above description of the embodiments of the present disclosure has been presented for purposes of illustration. It is not intended to be exhaustive or to limit the invention to the precise form disclosed. Those skilled in the art will appreciate that many modifications and variations are possible in light of the present disclosure.

Therefore, the scope of the present invention is not limited by the detailed description, but by the claims of the present disclosure. Accordingly, the embodiments of the present disclosure are illustrative and not intended to limit the scope of the present invention as set forth in the following claims.

What is claimed is:

1. A total energy management system for high energy efficiency of a cold chain logistics center, the system comprising:
an energy management system (EMS) server for collecting real-time data associated with the cold chain logistics center, wherein the EMS server processes the real-time data and generates at least one of real-time temperature data, real-time humidity data, renewable energy data, and electric power data of the cold chain logistics center; and
an artificial intelligence (AI) server for outputting temperature mapping data, defrosting time determination data, and an energy operation guide in the cold chain logistics center based on at least one of the real-time temperature data, the real-time humidity data, the renewable energy data, and the electric power data received from the EMS server,
wherein the EMS server switches between a plurality of management modes having different operating conditions for a heating, ventilation and air conditioning (HVAC) system, a lighting system, and a defrosting system of the cold chain logistics center based on the temperature mapping data, the defrosting time determination data, and the energy operation guide received from the AI server,
wherein the plurality of the management modes comprises:
a normal management mode configured to be applied to the cold chain logistics center in cases where a real-time data change of temperature-related data is less than a threshold, power consumption of the cold chain logistics center is less than or equal to a preset first trigger level, and no logistics volume change event is detected and no work schedule exists in the cold chain logistics center, wherein the temperature-related data comprise at least one of the temperature mapping data and the real-time temperature data,
a work management mode configured to be applied to the cold chain logistics center in cases where the real-time data change of the temperature-related data is greater than or equal to the threshold, or the power consumption of the cold chain logistics center is greater than or equal to the preset first trigger level and less than or equal to a second trigger level higher than the first trigger level, or the logistics volume change event is detected or the work schedule exists in the cold chain logistics center, and
a peak management mode configured to be applied to the cold chain logistics center in a case where the power consumption of the cold chain logistics center exceeds the second trigger level.

2. The system of claim 1, wherein the cold chain logistics center comprises the heating, ventilation, and air conditioning (HVAC) system, the lighting system, and the defrosting system,
wherein in the normal management mode,
a set temperature range of a refrigeration system of the HVAC system is a first temperature range, and a set temperature range of a freezing system is a second temperature range,
a set humidity range of the HVAC system is a first humidity range,
a reference illuminance of the lighting system is a first illuminance, and
the defrosting system operates according to a defrosting time determination received from the AI server,
wherein in the work management mode,
the set temperature range of the refrigeration system of the HVAC system is a third temperature range lower than the first temperature range, and the set temperature range of the freezing system is a fourth temperature range lower than the second temperature range,
the set humidity range of the HVAC system is a second humidity range higher than the first humidity range,
the reference illuminance of the lighting system is a second illuminance higher than the first illuminance, and
the defrosting system operates according to the defrosting time determination received from the AI server, and
wherein in the peak management mode,
power of an energy storage system of the cold chain logistics center is supplied to the HVAC system or the HVAC system is turned off,
the lighting system maintains the first illuminance only for some facilities of the cold chain logistics center, and
the defrosting system operates to delay a defrosting time.

3. The system of claim 1, wherein switching is effected between multiple AC/DC power supply modes of the cold chain logistics center based on the energy operation guide,
wherein the multiple AC/DC power supply modes comprise:
a basic mode in which grid power and energy stored in an energy storage system are used at the same time;
a best condition mode in which renewable energy power generation and the grid power are used at the same time when weather conditions around the cold chain logistics center are the best; and
a maximum power save mode in which the grid power is not used, and the energy stored in the energy storage system and the renewable energy power generation are used when power consumption of the cold chain logistics center reaches a preset trigger level.

4. An energy management method for high energy efficiency of a cold chain logistics center, wherein the method is performed by an energy management system (EMS) server, the method comprising:
collecting real-time data associated with the cold chain logistics center,
generating at least one of real-time temperature data, real-time humidity data, renewable energy data, and electric power data of the cold chain logistics center by processing the real-time data;
receiving at least one of temperature mapping data, defrosting time determination data, and an energy operation guide in the cold chain logistics center from an artificial intelligence (AI) server, wherein the at least one of the temperature mapping data, the defrosting time determination data, and the energy operation guide in the cold chain logistics center is generated based on the at least one of the real-time temperature data, the real-time humidity data, the renewable energy data, and the electric power data;
switching between a plurality of management modes having different operating conditions for the cold chain logistics center based on the at least one of the temperature mapping data, the defrosting time determination data, and the energy operation guide,
wherein the plurality of the management modes comprises:
a normal management mode configured to be applied to the cold chain logistics center in cases where a real-time data change of temperature-related data is less than a threshold, power consumption of the cold chain logistics center is less than or equal to a preset first trigger level, and no logistics volume change event is detected and no work schedule exists in the cold chain logistics center, wherein the temperature-related data comprise at least one of the temperature mapping data and the real-time temperature data,
a work management mode configured to be applied to the cold chain logistics center in cases where the real-time data change of the temperature-related data is greater than or equal to the threshold, or the power consumption of the cold chain logistics center is greater than or equal to the preset first trigger level and less than or equal to a second trigger level higher than the first trigger level, or the logistics volume change event is detected or the work schedule exists in the cold chain logistics center, and
a peak management mode configured to be applied to the cold chain logistics center in a case where the power consumption of the cold chain logistics center exceeds the second trigger level.

* * * * *